United States Patent
Murakami et al.

(10) Patent No.: US 10,167,021 B2
(45) Date of Patent: Jan. 1, 2019

(54) VEHICULAR RESIN PANEL STRUCTURE AND LUGGAGE DOOR

(71) Applicant: Toyota Jidosha Kabushiki Kaisha, Toyota-shi, Aichi-ken (JP)

(72) Inventors: Atsuhiko Murakami, Nisshin (JP); Junya Kato, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/250,178

(22) Filed: Aug. 29, 2016

(65) Prior Publication Data

US 2017/0057560 A1 Mar. 2, 2017

(30) Foreign Application Priority Data

Aug. 31, 2015 (JP) .................. 2015-171383

(51) Int. Cl.
*B62D 25/10* (2006.01)
*B62D 29/04* (2006.01)
*B62D 25/08* (2006.01)

(52) U.S. Cl.
CPC ......... *B62D 25/105* (2013.01); *B62D 25/087* (2013.01); *B62D 25/10* (2013.01); *B62D 29/043* (2013.01)

(58) Field of Classification Search
CPC .... B62D 25/087; B62D 25/10; B62D 25/105; B62D 29/04
USPC ........................................ 296/76, 181.2, 191
See application file for complete search history.

(56) References Cited

U.S. PATENT DOCUMENTS

| | | | | |
|---|---|---|---|---|
| 7,578,548 | B2* | 8/2009 | Behr | B60R 21/34 180/69.2 |
| 9,162,555 | B2* | 10/2015 | Kodama | B60J 5/107 |
| 9,499,032 | B2* | 11/2016 | Ikeda | B60J 5/101 |
| 2012/0280533 | A1* | 11/2012 | Gachter | B60J 5/101 296/146.8 |
| 2012/0306231 | A1* | 12/2012 | Ginestet | B60J 5/101 296/76 |

(Continued)

FOREIGN PATENT DOCUMENTS

| EP | 2653331 A1 | 10/2013 |
|---|---|---|
| JP | 2005001627 A | 1/2005 |
| JP | 2005239062 A | 9/2005 |

(Continued)

*Primary Examiner* — Jason S Daniels
(74) *Attorney, Agent, or Firm* — Dinsmore & Shohl LLP

(57) ABSTRACT

A vehicular resin panel structure is provided including a resin inner panel formed in a polygonal shape including a first edge portion, a second edge portion, and an angular portion, and fixed to a vehicle body at plural fixing points including a first fixing point and a second fixing point. The resin inner panel is further provided with a first rib further to an in-plane direction outer side of the resin inner panel than an imaginary line connecting the first fixing point and the second fixing point, and running along a direction intersecting the imaginary line. The first rib runs along a direction intersecting the imaginary line. The vehicular resin panel structure includes a resin outer panel including an outer end portion overlapping with the inner panel adhered to an inner end portion of the inner panel, and having a larger linear expansion coefficient than that of the inner panel.

18 Claims, 5 Drawing Sheets

(56) References Cited

U.S. PATENT DOCUMENTS

2015/0329147 A1* 11/2015 Iwano .................. B62D 25/105
                                                            296/193.11
2016/0229271 A1*  8/2016 Dassen .................... B60J 5/107

FOREIGN PATENT DOCUMENTS

| JP | 2006-341760 A | 12/2006 |
| JP | 2007118852 A  | 5/2007  |
| JP | 3931520 B2    | 6/2007  |
| JP | 2012-061957 A | 3/2012  |
| JP | 2012176710 A  | 9/2012  |
| JP | 2013-220751 A | 10/2013 |
| JP | 2014083904 A  | 5/2014  |
| JP | 2015093615 A  | 5/2015  |

* cited by examiner

VEHICULAR RESIN PANEL STRUCTURE AND LUGGAGE DOOR

CROSS-REFERENCE TO RELATED APPLICATION

This application is based on and claims priority under 35 USC 119 from Japanese Patent Application No. 2015-171383 filed on Aug. 31, 2015, the disclosure of which is incorporated by reference herein.

BACKGROUND

Technical Field

The present disclosure relates to a vehicular resin panel structure and luggage door.

Related Art

In vehicles such as automobiles, sometimes a resin panel member with the objective of reducing weight is employed. Japanese Patent Application Laid-Open (JP-A) No. 2006-341760 describes a panel structure in which plural resin panels with differing linear expansion coefficients are adhered to each other using glue.

When heat is applied to the panel structure in which plural resin panels with differing linear expansion coefficients are adhered to each other, the panel with a higher linear expansion coefficient expands a large amount, and the other panel with a lower linear expansion coefficient deforms under this influence. In cases in which the panel structure is fixed to a vehicle body at plural points, although the amount of deformation is small nearby the fixing points due to the panels being restrained, there is concern that the other panel deforms by a large amount at portions further from the fixing points accompanying the deformation of the one panel. Accordingly, there is room for improvement in suppressing panel deformation.

SUMMARY

In consideration of the above possibility, the present disclosure is configured by plural resin panels with differing linear expansion coefficients, and suppresses heat deformation of panels in cases in which a vehicular resin panel structure and luggage door are fixed to a vehicle body at plural points.

A vehicular resin panel structure according to a first aspect includes a resin inner panel formed in a polygonal shape including a first edge portion, a second edge portion adjacent to the first edge portion, and an angular portion formed at an inner side of an angle formed by the first edge portion and the second edge portion, fixed to a vehicle body at a plurality of fixing points including a first fixing point provided at the first edge portion and a second fixing point provided at the second edge portion. The resin inner panel is provided with a first rib further to an in-plane direction outer side of the resin inner panel than an imaginary line connecting the first fixing point and the second fixing point. The first rib runs along a direction intersecting the imaginary line. The vehicular resin panel structure includes a resin outer panel having an outer end portion overlapping with the inner panel adhered to an inner end portion of the inner panel, and having a larger linear expansion coefficient than that of the inner panel.

Operation of the first aspect is as follows. In cases in which the linear expansion coefficient of the outer panel is greater than that of the inner panel in the vehicular resin panel structure, the outer panel expands more than the inner panel when input with heat, thereby undergoing deformation so as to curve by bowing toward the vehicle outer side. The inner panel joined to the outer panel accordingly also undergoes deformation accompanying deformation of the outer panel. In such cases, the inner panel formed in a polygonal shape is fixed to the vehicle body at plural fixing points, such that a rotation moment develops about an axis of the imaginary line connecting the fixing points together. As a result, there is concern that a portion further to the in-plane direction outer side of the inner panel than the imaginary line, including the angular portion undergoes warping deformation so as to bend about an origin of the imaginary line toward the vehicle inner side.

However, in the vehicular resin panel structure according to the present invention, the first rib is provided further to the in-plane direction outer side of the resin inner panel than the imaginary line connecting the first fixing point and the second fixing point where the inner panel is fixed to the vehicle body, running along a direction intersecting the imaginary line. Thus, the rigidity of the angular portion is increased, and the angular portion is less liable to extend, enabling warping deformation about an origin of the imaginary line to be suppressed. Accordingly, deformation of the inner panel can be suppressed.

The vehicular resin panel structure according to a second aspect is the vehicular resin panel structure according to the first aspect, wherein the inner panel further includes a third edge portion facing the first edge portion; a third fixing point provided to the third edge portion and fixed to the vehicle body; and a second rib provided between the first fixing point and the third fixing point, and extending along a direction parallel to an imaginary line connecting the first fixing point and the third fixing point.

In the second aspect, by suppressing deformation of the angular portion, deformation is released toward the in-plane direction inner side of the inner panel, and deformation curving by bowing toward the vehicle outer side becomes large. Moreover, in cases in which a third fixing point is provided to the third edge portion facing the first edge portion, warping deformation sometimes develops between the first fixing point and the third fixing point. However, in the vehicular resin panel structure according to the present invention, the second rib running in a direction parallel to the imaginary line connecting the first fixing point and the third fixing point is provided between the first fixing point and the third fixing point, thereby enabling extension of the inner panel to be suppressed. Warping deformation between the first fixing point and the third fixing point can thereby be suppressed.

The vehicular resin panel structure according to a third aspect is the vehicular resin panel structure according to the first aspect or the second aspect, wherein the first edge portion includes the inner end portion, an outer side inclined portion formed continuously at an in-plane direction inner side of the inner end portion inclined in a direction away from the outer panel, and an outer side flat portion formed continuously at an in-plane direction inner side of the outer side inclined portion and extending in the in-plane direction of the inner panel. The first rib is provided continuously from the outer side inclined portion to the outer side flat portion.

In the third aspect, deformation of the inner end portion is suppressed by providing the first rib to the outer side inclined portion that is adjacent to the inner end portion. The further the distance from the imaginary line, the greater the amount of deformation when the inner panel has undergone warping deformation about an origin of the imaginary line connecting the first fixing point and the second fixing point, and so by increasing the bending rigidity in the vicinity of the inner end portion, deformation of the inner panel can be effectively suppressed.

The vehicular resin panel structure according to a fourth aspect is the vehicular resin panel structure according to the third aspect, further including an inner side inclined portion formed continuously at the in-plane direction inner side of the outer side flat portion inclined in a direction away from the outer panel; and an inner side flat portion formed continuously at the in-plane direction inner side of the inner side inclined portion, and extending in the in-plane direction of the inner panel. The first rib is provided continuously from the outer side inclined portion to the inner side inclined portion.

In the fourth aspect of the present invention, the first rib is formed continuously at the outer side inclined portion, the outer side flat portion, and the inner side inclined portion. There are bend points between the outer side inclined portion and the outer side flat portion, and between the outer side flat portion and the inner side inclined portion, where the respective angles of inclination change. When the inner panel has undergone warping deformation, it is conceivable that the amount of deformation of the inner end portion further increases due to due to deformation of these bend points. Accordingly, by providing the first rib that suppresses deformation at the bend points, deformation of the inner panel can be even more effectively suppressed.

A luggage door according to a fifth aspect is configured including the resin inner panel and the resin outer panel of any one of the first aspect to the fourth aspect, and is fixed to the vehicle body at the first fixing point and the second fixing point.

In the fifth aspect, the advantageous effects described in the first aspect to the fourth aspect are obtained by the luggage door. Namely, in a vehicle in which the luggage door according to the present invention is attached, deformation of the inner panel further to the in-plane direction outer side than the imaginary line connecting the first fixing point and the second fixing point can be suppressed when, for example, heat is applied in a drying process following paint application. Interference between an end portion of the luggage door and the vehicle body can thereby be suppressed.

The vehicular resin panel structure and luggage door according to the present aspect, with a resin panel structure configured using resin with differing linear expansion coefficients, has the excellent advantageous effect of enabling deformation of an inner panel fixed to a vehicle body at plural points to be suppressed.

BRIEF DESCRIPTION OF THE DRAWINGS

Exemplary embodiments of the present invention will be described in detail based on the following figures, wherein.

DETAILED DESCRIPTION

Figure 1:
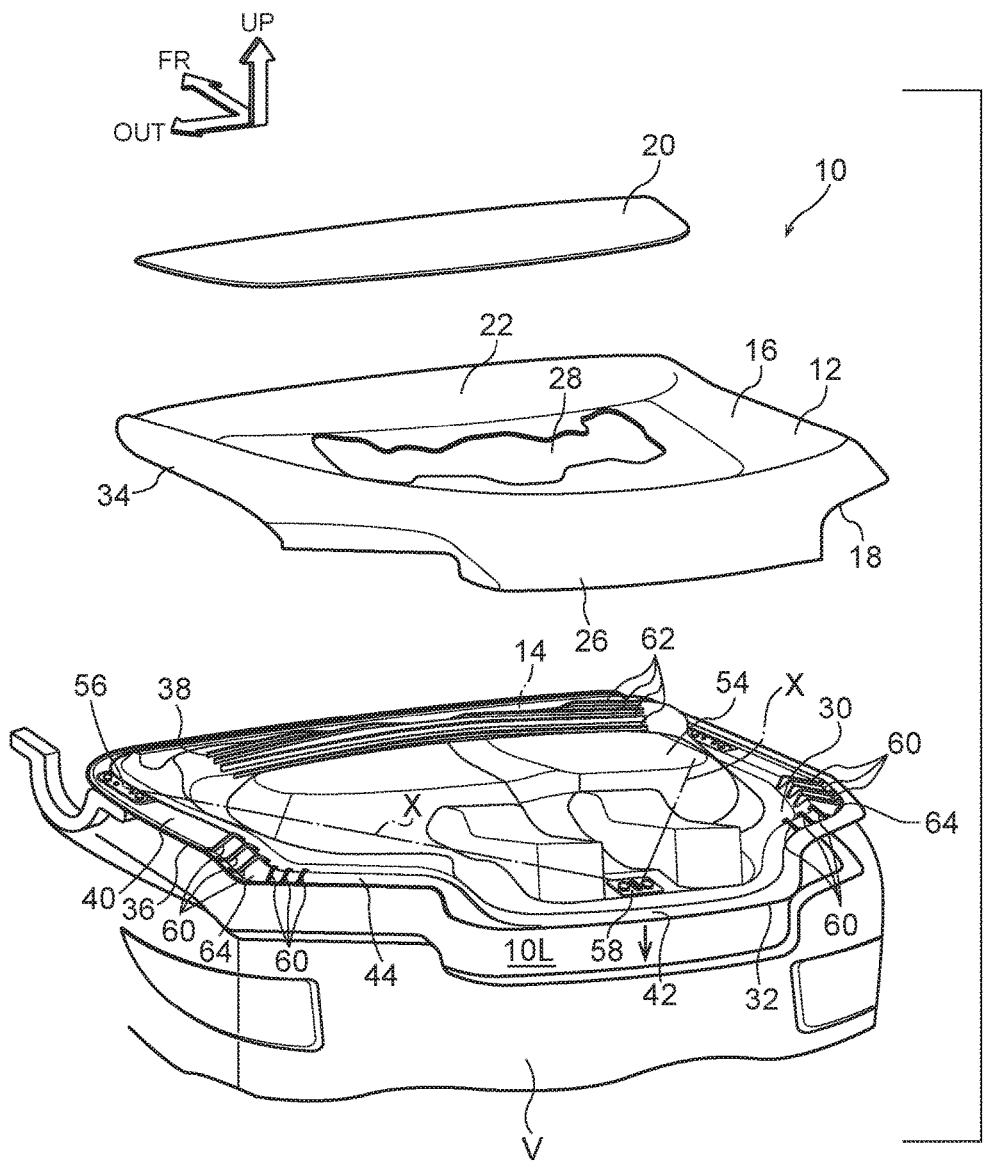
FIG. 1 is a perspective view illustrating an inner panel and an outer panel of a luggage door of an exemplary embodiment separated from each other.

Explanation follows regarding a vehicular resin panel structure and luggage door according to the present exemplary embodiment, with reference to FIG. 1 to FIG. 5. In the drawings, the arrow FR indicates the vehicle front side, the arrow UP indicates the vehicle upper side, and the arrow OUT indicates the vehicle width direction outer side, as appropriate. Note that in FIG. 2 and FIG. 5, a vehicular resin panel structure according to the present exemplary embodiment is basically formed with left-right symmetry. Thus, only the left side half of an inner panel is illustrated, and the right side half of the inner panel is omitted from illustration.

As illustrated in FIG. 1, the vehicular resin panel structure and luggage door according to the present exemplary embodiment is applied to a luggage door 10 of a vehicle. A luggage compartment 10L open toward the vehicle upper side is provided at a vehicle front-rear direction rear section side of the vehicle. The luggage door 10 is supported by a vehicle body V using hinges 56 (first fixing point, third fixing point), described later, capable of opening and closing the luggage compartment 10L.

The luggage door 10 is configured by a resin outer panel 12 and a resin inner panel 14. In the present exemplary embodiment, the resin outer panel 12 is formed using polycarbonate/polyethylene terephthalate (PC/PET) and the resin inner panel 14 is formed using carbon fiber reinforced plastic (CFRP); the linear expansion coefficient of the outer panel 12 is approximately $6 \times 10^{-5}/°$ C., and the linear expansion coefficient of the inner panel 14 is approximately $0.5 \times 10^{-5}/°$ C. Namely, the linear expansion coefficient of the outer panel 12 is ten times the linear expansion coefficient of the inner panel 14, or greater.

An outer face 16 of the outer panel 12 configures a design face of the vehicle, and an inner face 18 of the outer panel 12 faces the inner panel 14. An outer garnish 20 made of PC/PET, similarly to the outer panel 12, is integrally attached to a vehicle front-rear direction front side of the outer face 16, and a plate shaped reinforcement 18A (see FIG. 3) is attached to the inner face 18. The outer panel 12 is configured by a main body section 22 positioned at the vehicle up-down direction upper side of the luggage compartment 10L, and a rear face section 26 extending from a vehicle front-rear direction rear side of the main body section 22 toward a vehicle up-down direction lower side. The cross-section profile of the outer panel 12 is configured substantially in an L shape, as viewed along the vehicle width direction.

The main body section 22 of the outer panel 12 is configured in a plate shape extending along the vehicle front-rear direction and the vehicle width direction. An opening 28 for attaching a spoiler, not illustrated in the drawings, is provided at the vehicle front-rear direction rear side of the main body section 22. Note that a clip-shaped fastening portion is integrally formed to the spoiler, and, in a state in which a fastening hole provided in the vicinity of the opening 28 and a fastening hole provided in the inner panel 14, described later, are overlapped above and below each other, the fastening portion of the spoiler is inserted, and then fastened and fixed to the outer panel 12 and the inner panel 14. A vehicle width direction central portion of the rear face section 26 extends out further to the vehicle up-down direction lower side than both vehicle width direction end portions of the rear face section 26.

Figure 3:
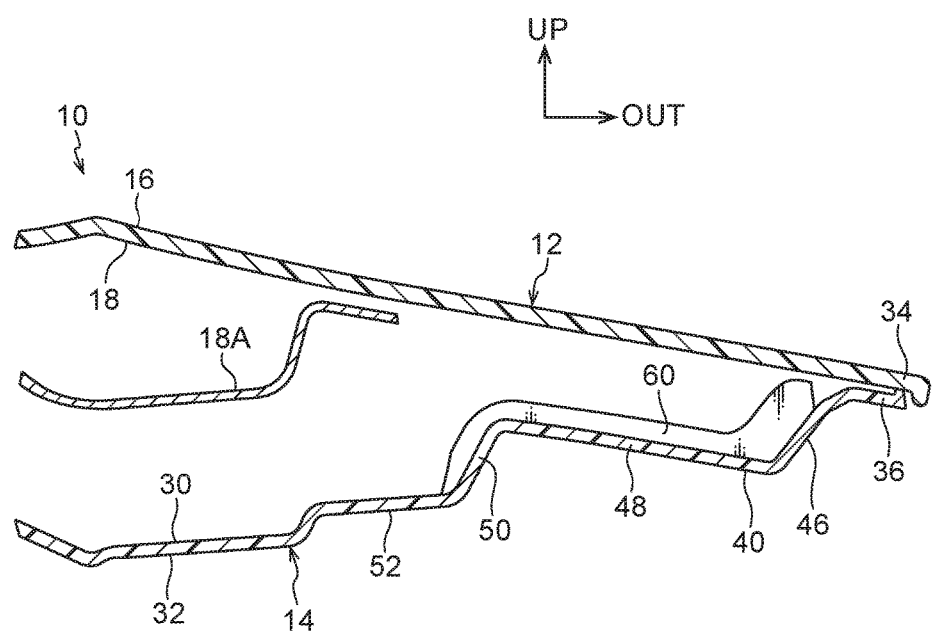
FIG. 3 is a vertical cross-section illustrating a state in which the luggage door is sectioned along line A-A in FIG. 2.

As illustrated in FIG. 3, an outer face 30 of the inner panel 14 faces the inner face 18 of the outer panel 12 and an inner face 32 of the inner panel 14 faces the luggage compartment 10L. The inner panel 14 is substantially the same size as the outer panel 12, and an inner end portion 36 at an in-plane direction outer side of the inner panel 14 is provided slightly further to an in-plane direction inner side of the inner panel 14 than an outer end portion 34 at the in-plane direction outer side of the outer panel 12. The inner end portion 36 and the outer end portion 34 are adhered to each other by glue, not illustrated in the drawings.

Note that the glue employed in the present exemplary embodiment is an elastic glue for adhering resin members together, and is applied with a thickness of 5 mm, or less. The thicker the thickness of the elastic glue, the more readily the elastic glue extends in the in-plane direction, and the more restraint force weakens in the in-plane direction of the panel. Thus, in cases in which the outer end portion 34 deforms so as to extend toward the in-plane direction outer side, there is concern that the glue is unable to restrain the panel, and thus the outer end portion 34 interferes with the vehicle body V. In consideration of this possibility, in the present exemplary embodiment, interference between the outer end portion 34 and the vehicle body V is suppressed by making the thickness of the glue thinner.

Figure 2:
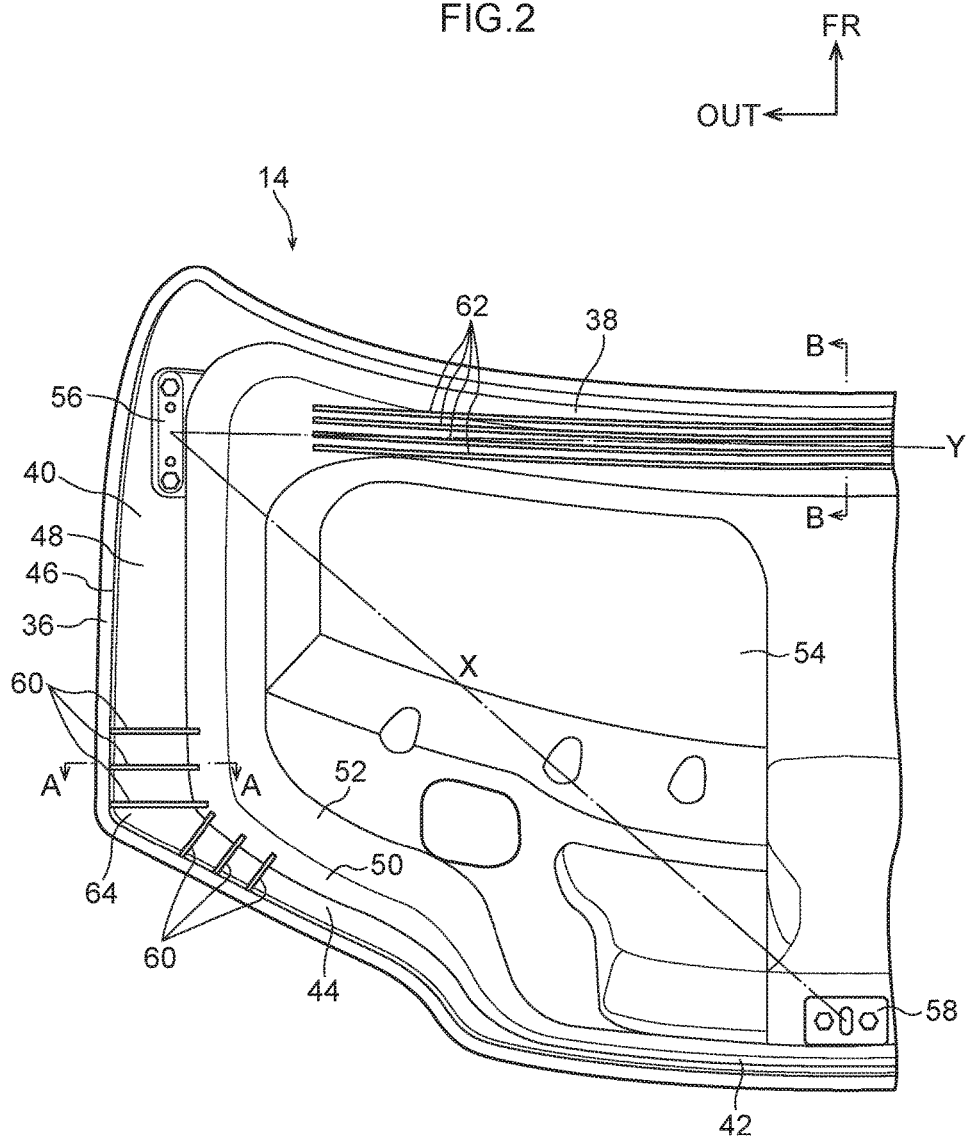
FIG. 2 is a plan view illustrating the left half of the inner panel in FIG. 1.

As illustrated in FIG. 2, the inner panel 14 is formed in a substantially hexagonal shape with outer peripheral edges configured by a front edge 38 extending along the vehicle width direction at the vehicle front-rear direction front side of the panel, a pair of left and right first side edges 40 (first edge portion) respectively extending from vehicle width direction end portions of the front edge 38 toward the vehicle front-rear direction rear side, a rear edge 42 extending along the vehicle width direction at a rear end of the panel, and a pair of left and right second side edges 44 (second edge portion) that respectively connect the first side edges 40 and the rear edge 42 together. An angular portion 64 is formed between each first side edge 40 and second side edge 44 (inside of the angle).

As illustrated in FIG. 3, and as previously described, the inner end portion 36 extending parallel to the in-plane direction of the outer panel 12 is formed at the first side edge 40 of the inner panel 14. The glue, not illustrated in the drawings, is applied to the inner end portion 36, and adheres the inner end portion 36 to the outer end portion 34. As illustrated in FIG. 2, an outer side inclined portion 46 formed continuously to the inner end portion 36 is provided further to the in-plane direction inner side than the inner end portion 36. The outer side inclined portion 46 is inclined toward the in-plane direction inner side and toward a direction away from the outer panel 12. An outer side flat portion 48 continuous to the outer side inclined portion 46 is formed further to the in-plane direction inner side than the outer side inclined portion 46. The outer side flat portion 48 extends parallel to the in-plane direction of the opposing outer panel 12. Note that the vehicle width direction width of the outer side flat portion 48 at the first side edge 40 increases on progression toward the vehicle front-rear direction rear side; however, the vehicle width direction width of the outer side flat portion 48 at the second side edge 44 decreases on progression toward the vehicle front-rear direction rear side.

An inner side inclined portion 50 is formed at the in-plane direction inner side of the outer side flat portion 48. The inner side inclined portion 50 is inclined toward the in-plane direction inner side and toward the direction away from the outer panel 12. An inner side flat portion 52 is provided further to the in-plane direction inner side than the inner side inclined portion 50. The inner side flat portion 52 extends along the in-plane direction of the outer panel 12 and the inner panel 14. A protrusion 54 (see FIG. 2) that protrudes toward the outer panel side is provided even further to the in-plane direction inner side than the inner side flat portion 52.

The hinge 56, which fixes the luggage door to the vehicle body V, is provided to the outer side flat portion 48 at the vehicle front-rear direction front side of the first side edge 40, as illustrated in FIG. 2. The hinge 56 is fixed to the inner face 32 of the inner panel 14 by bolts or the like, and enables the luggage door 10 by opened or closed by moving the luggage door 10 to an open position or a closed position. A pair of left and right hinges 56 are installed so as to be at the same vehicle front-rear direction position as each other.

A door lock 58 (second fixing point) is provided to the inner side flat portion 52 at a vehicle width direction center of the rear edge 42. The luggage door 10 is kept in the closed state by the door lock 58 and an engagement portion, not illustrated in the drawings, provided to the vehicle body V side engaging with each other.

In the present exemplary embodiment, out of the pair of left and right hinges 56, first ribs 60 are provided further to the in-plane direction outer side of the inner panel 14 than an imaginary line X connecting one hinge 56 and the door lock 58, running along a direction intersecting the imaginary line X. More specifically, first ribs 60, these being nearby the angular portion 64 provided at the inside of the angle formed by the first side edge 40 and the second side edge 44, are respectively provided at the vehicle front-rear direction rear side of the first side edge 40 and the vehicle width direction outer side of the second side edge 44. The first ribs 60 are spaced apart from the inner face 18 of the outer panel 12. Plural of the first ribs 60 are provided, and as an example, in the present exemplary embodiment, six of the first ribs 60 are provided in total: three first ribs 60 are provided to the first side edge 40, and three first ribs 60 are provided to the second side edge 44.

In the first side edge 40 and the second side edge 44, the first ribs 60 are continuous from the outer side inclined portion 46 through the outer side flat portion 48 to the inner side inclined portion 50, and the cross-section profiles of the first ribs 60 sectioned along an extension direction of the first ribs 60 are formed in S shapes (see FIG. 3). Plural of the first ribs 60 are provided running along the direction intersecting the imaginary line X connecting the hinge 56 and the door lock 58. More specifically, the first ribs 60 provided to the first side edge 40 are provided at an angle orthogonal to an extension direction of the first side edge 40, and the first ribs 60 provided to the second side edge 44 are provided at an angle orthogonal to an extension direction of the second side edge 44. It is sufficient that the extension directions of the first ribs 60 are at angles close to a right angle with respect to the imaginary line X. More specifically, as long as the extension directions of the first ribs 60 are at least the same as the vehicle width direction or a direction closer than the vehicle width direction to a direction orthogonal to the imaginary line X, or are at least the same as the vehicle front-rear direction or a direction closer than the vehicle front-rear direction to a direction orthogonal to the imaginary line X, the advantageous effect of suppressing warping can be increased.

Note that in the present invention, "direction intersecting the imaginary line X" merely means "a direction along a direction of warping deformation about an origin of the imaginary line X", and so the present invention does not encompass cases in which the advantageous effects cannot be obtained in practice, such as when the difference in angle between the first ribs 60 and the imaginary line X is small (±5° or less).

Figure 4:
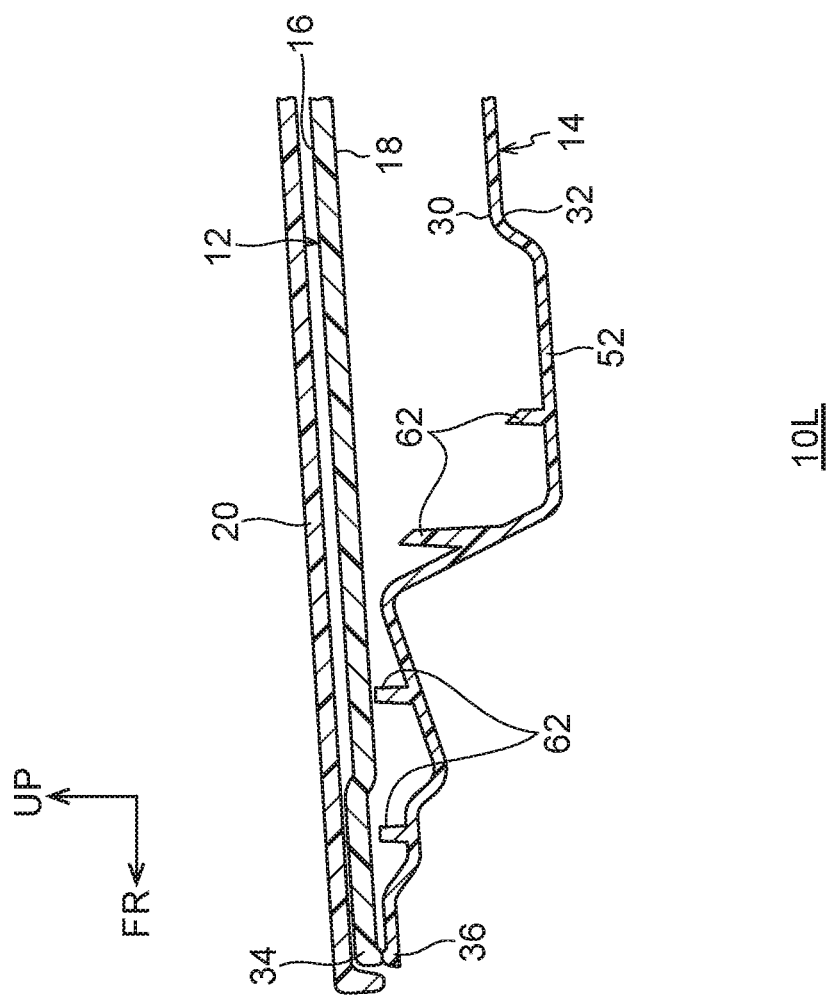
FIG. 4 is a vertical cross-section illustrating a state in which the luggage door is sectioned along line B-B in FIG. 2.

As illustrated in FIG. 4, in the present exemplary embodiment, second ribs 62 are provided between the pair of left and right hinges 56. Plural of the second ribs 62 are provided along a direction parallel to an imaginary line Y connecting the pair of left and right hinges 56, and as an example, the present exemplary embodiment is configured by four of the second ribs 62. Note that in the present invention, "direction parallel to an imaginary line" means "direction along a direction of warping deformation occurring between the pair of left and right hinges of the inner panel 14" and so the extension direction of the second ribs 62 may not be perfectly parallel to the imaginary line, and the effect of suppressing warping deformation is high as long as the angle difference is ±45° or less.

Explanation follows regarding operation and advantageous effects of the vehicular resin panel structure and luggage door according to the present exemplary embodiment.

In cases in which heat is applied to the luggage door 10 that joins the inner panel 14 and the outer panel 12 having a linear expansion coefficient larger than that of the inner panel 14, such as during a paint drying process, the outer panel 12 expands more than the inner panel 14. In the present exemplary embodiment, the thickness of the glue that adheres the inner panel 14 and the outer panel 12 to each other is 5 mm or less, such that the outer end portion 34 is restrained by the glue, and the outer end portion 34 is unable to extend toward the in-plane direction outer side. Thus, the outer panel 12 deforms such that the in-plane direction central portion of the outer panel 12 protrudes in a curved shape toward the vehicle outer side.

Figure 5:
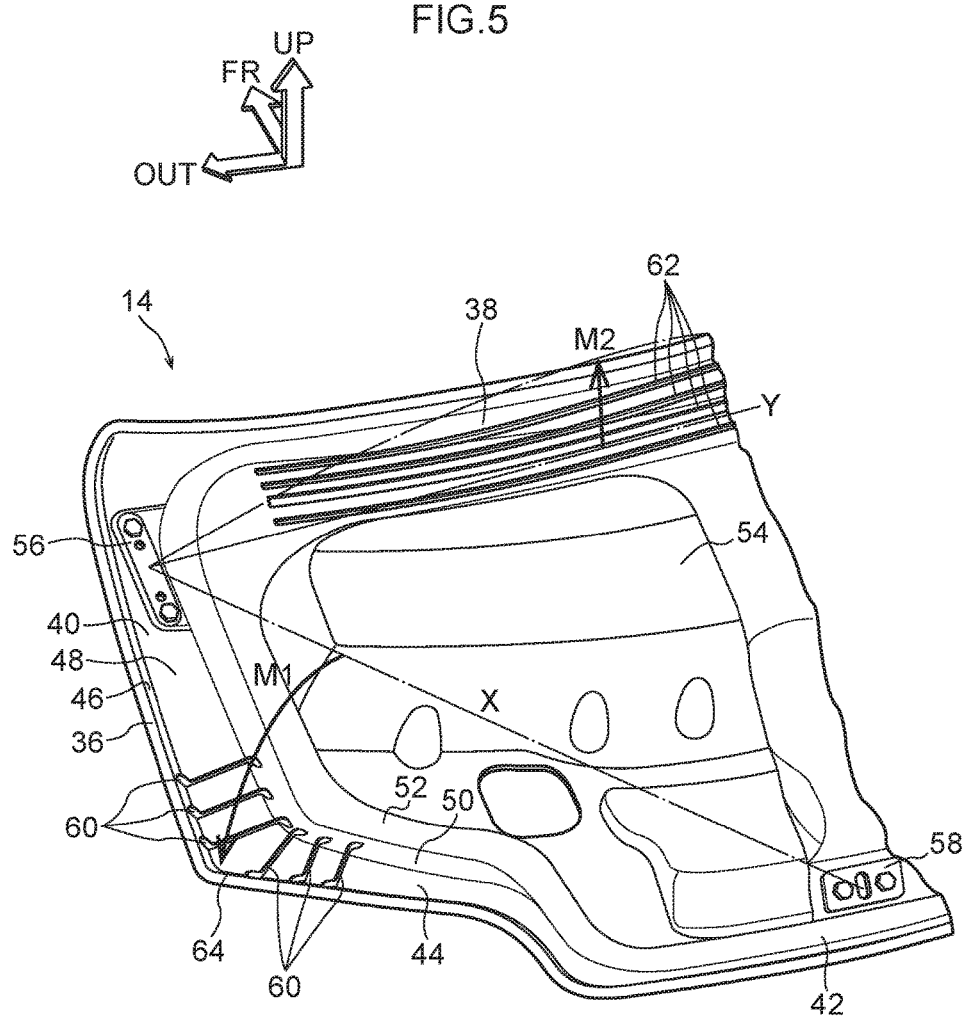
FIG. 5 is a perspective view illustrating directions of deformation of the inner panel in FIG. 2.

As illustrated in FIG. 5, under the influence of deformation of the outer panel 12, the inner panel 14 also attempts to deform so as to approach the shape of the outer panel 12. However, due to being fixed to the vehicle body V by the hinge 56 and the door lock 58, the inner panel 14 is less liable to deform nearby the fixing points. As a result, a curving moment M1 develops about an origin of the imaginary line X connecting the hinge 56 and the door lock 58, and a portion further to the faced direction outer side than the imaginary line X undergoes warping deformation so as to bend toward the vehicle inner side. In particular, the amount of deformation of the angular portion 64 that is at a distance further from the imaginary line X becomes larger.

Note that in the present exemplary embodiment, the first ribs 60 are provided further to the in-plane direction outer side of the inner panel 14 than the imaginary line X connecting the hinges 56 and the door lock 58, running along a direction intersecting the imaginary line X. The panel can be made less liable to extend due to providing the first ribs 60 that extend in the same direction as warping deformation about an origin of the imaginary line X namely, as deformation extending along a direction intersecting the imaginary line X. Accordingly, warping deformation of the panel further to the in-plane direction outer side thereof than the imaginary line X, namely, nearby the angular portion 64, can be suppressed.

In the present exemplary embodiment, parallel ribs are provided between the left and right pair of hinges 56 along the imaginary line Y connecting the hinges 56. As described above, in cases in which deformation of the angular portion 64 is suppressed by the first ribs 60, deformation of the panel further to the vehicle front-rear direction rear side than the imaginary line X becomes small. As a result, the inner panel 14 attempts to release deformation at the vehicle front-rear direction front side, a moment M2 toward the vehicle outer side develops between the hinges 56, and warping deformation curving by bowing toward the vehicle outer side develops. Note that FIG. 5 illustrates the left half of the moment M2 which develops between the left and right hinges 56. In the present exemplary embodiment, extension of the panel between the hinges is suppressed, and warping deformation between the hinges can be suppressed by providing second ribs 62 parallel to the imaginary line Y connecting the left and right hinges 56.

Furthermore, in explanation regarding the first ribs 60 of the present exemplary embodiment, the first ribs 60 are provided continuously from the outer side inclined portion 46 to the outer side flat portion 48. The outer side inclined portion 46 is adjacent to the inner end portion 36 that is adhered to the outer panel 12. Accordingly, warping deformation of the angular portion 64 can be even more effectively suppressed by providing the first ribs 60 close to the inner end portion 36, where deformation is particularly large.

Moreover, the first ribs 60 are provided continuously from the outer side inclined portion 46, through the outer side flat portion 48, to the inner side inclined portion 50. Bend points form between the outer side inclined portion 46 and the outer side flat portion 48, and between the outer side flat portion 48 and the inner side inclined portion 50. When the panel has undergone warping deformation, it is conceivable that the amount of deformation of the inner end portion 36 further increases due to these bend points undergoing deformation. In the present exemplary embodiment, an increase in the amount of deformation of the inner end portion 36 due to the deformation of the bend points can be suppressed by providing the first ribs 60 at these two bend points.

Note that in the present exemplary embodiment, in the inner panel 14 of the luggage door 10, the left and right pair of hinges 56 provided to the first side edges 40 and the door lock 58 provided to the rear edge 42 are fixed to the vehicle body V, and the imaginary lines connecting these respective fixing points form a triangular shape. Ribs for suppressing warping are respectively provided at these three imaginary lines. Thus, for example, when heat is applied to the vehicle body V in a drying process following paint application, warping deformation of the inner panel 14 of the luggage door 10 assembled to the vehicle body V can be suppressed. Thus, interference between the luggage door 10 and the vehicle body V due to the inner end portion 36 undergoing deformation can be suppressed.

Examples of Other Applications

In the present exemplary embodiment, explanation has been given regarding an example in which the first ribs 60 are formed continuously at the outer side inclined portion 46, the outer side flat portion 48, and the inner side inclined portion 50. However, is it not necessary for the first ribs 60 to be provided to all three of the above-mentioned locations, and the first ribs 60 may be provided to one, or two locations. The first ribs 60 may be provided to locations other than the above-mentioned three locations, for example, to the inner side flat portion 52 or the protrusion 54 positioned further to the in-plane direction outer side than the imaginary line X.

Moreover, the shapes of the first ribs 60 and the second ribs 62 are not required to extend in a straight line, and the extension directions may be changed to match the shape of the inner panel 14 partway, or may be configured in wave shapes. Warping can be even more effectively suppressed by increasing the height of the ribs at portions where warping deformation is particularly large, and by increasing the cross-section area of the ribs. The ribs do not necessarily need to be provided continuously, and may be provided in fragments by providing intermittent breaks or the like. Note that present exemplary embodiment is configured with a plural number of ribs; however, the advantageous effects can be obtained even using just one rib.

In the present exemplary embodiment, the vehicular resin panel structure is applied to a luggage door; however, application may be made to a vehicle hood, a vehicle back door, a vehicle roof, or the like, in which plural plate members with differing linear expansion coefficients are joined together. Note that even in cases in which the present invention is applied to panel structures joining plural metal panels with differing linear expansion coefficients, or to panel structures in which a resin panel is adhered to a metal panel, a corresponding advantageous effect can be obtained.

What is claimed is:

1. A vehicular resin panel structure comprising:
    a resin inner panel:
        formed in a polygonal shape including a first edge portion, a second edge portion adjacent to the first edge portion, and an angular portion formed at an inner side of an angle formed by the first edge portion and the second edge portion,
        fixed to a vehicle body at a plurality of fixing points including a first fixing point provided at the first edge portion and a second fixing point provided at the second edge portion, and
        provided with a first rib further to an in-plane direction outer side of the resin inner panel than an imaginary line connecting the first fixing point and the second fixing point, the first rib running along a direction intersecting the imaginary line, the first rib has a generally S-shape, the first rib is provided so as to straddle a bend portion that is formed further to an in-plane direction inner side than inner end portions of the first edge portion and the second end portion; and
    a resin outer panel having an outer end portion overlapping with the inner panel, the outer end portion of the outer panel adhered to the inner end portion of the inner panel with an elastic glue having a thickness 5 mm or less, and the resin outer panel having a larger linear expansion coefficient than that of the inner panel.

2. The vehicular resin panel structure of claim 1, wherein the resin inner panel further comprises:
    a third edge portion facing the first edge portion;
    a third fixing point provided at the third edge portion and fixed to the vehicle body; and
    a second rib provided between the first fixing point and the third fixing point, and extending along a direction parallel to an imaginary line connecting the first fixing point and the third fixing point.

3. The vehicular resin panel structure of claim 2, wherein:
    the first edge portion includes the inner end portion, an outer side inclined portion formed continuously at the in-plane direction inner side of the inner end portion inclined in a direction away from the outer panel, and an outer side flat portion formed continuously at an in-plane direction inner side of the outer side inclined portion and extending in the in-plane direction of the inner panel; and
    the first rib is provided continuously from the outer side inclined portion to the outer side flat portion.

4. The vehicular resin panel structure of claim 3, further comprising:
    an inner side inclined portion formed continuously at the in-plane direction inner side of the outer side flat portion inclined in a direction away from the outer panel; and
    an inner side flat portion formed continuously at the in-plane direction inner side of the inner side inclined portion, and extending in the in-plane direction of the inner panel,
    wherein the first rib is provided continuously from the outer side inclined portion to the inner side inclined portion.

5. The vehicular resin panel structure of claim 4, wherein the bend portion positioned between the inner side inclined portion and the outer side flat portion.

6. The vehicular resin panel structure of claim 1, wherein:
    the first edge portion includes the inner end portion, an outer side inclined portion formed continuously at the in-plane direction inner side of the inner end portion inclined in a direction away from the outer panel, and an outer side flat portion formed continuously at an in-plane direction inner side of the outer side inclined portion and extending in the in-plane direction of the inner panel; and
    the first rib is provided continuously from the outer side inclined portion to the outer side flat portion.

7. The vehicular resin panel structure of claim 6, further comprising:
    an inner side inclined portion formed continuously at the in-plane direction inner side of the outer side flat portion inclined in a direction away from the outer panel; and
    an inner side flat portion formed continuously at the in-plane direction inner side of the inner side inclined portion, and extending in the in-plane direction of the inner panel,
    wherein the first rib is provided continuously from the outer side inclined portion to the inner side inclined portion.

8. The vehicular resin panel structure of claim 7, wherein the bend portion positioned between the inner side inclined portion and the outer side flat portion.

9. A luggage door including the resin inner panel and the resin outer panel of claim 1, the luggage door being fixed to the vehicle body at the first fixing point and the second fixing point.

10. A vehicular resin panel structure comprising:
    a resin inner panel:
        formed in a polygonal shape including a first edge portion, a second edge portion adjacent to the first edge portion, and an angular portion formed at an inner side of an angle formed by the first edge portion and the second edge portion,
        fixed to a vehicle body at a plurality of fixing points including a first fixing point provided at the first edge portion and a second fixing point provided at the second edge portion, and
        provided with a first rib further to an in-plane direction outer side of the resin inner panel than an imaginary line connecting the first fixing point and the second fixing point, the first rib running along a direction intersecting the imaginary line, the first rib is provided so as to straddle a bend portion that is formed further to an in-plane direction inner side than inner end portions of the first edge portion and the second end portion; and
    a resin outer panel having an outer end portion overlapping with the inner panel, the outer end portion of the outer panel adhered to the inner end portion of the inner panel with an elastic glue having a thickness 5 mm or less, and the resin outer panel having a larger linear expansion coefficient than that of the inner panel, wherein the first rib is spaced apart from an inner face of the outer panel.

11. The vehicular resin panel structure of claim 10, wherein the resin inner panel further comprises:
a third edge portion facing the first edge portion;
a third fixing point provided at the third edge portion and fixed to the vehicle body; and
a second rib provided between the first fixing point and the third fixing point, and extending along a direction parallel to an imaginary line connecting the first fixing point and the third fixing point.

12. The vehicular resin panel structure of claim 11, wherein:
the first edge portion includes the inner end portion, an outer side inclined portion formed continuously at the in-plane direction inner side of the inner end portion inclined in a direction away from the outer panel, and an outer side flat portion formed continuously at an in-plane direction inner side of the outer side inclined portion and extending in the in-plane direction of the inner panel; and
the first rib is provided continuously from the outer side inclined portion to the outer side flat portion.

13. The vehicular resin panel structure of claim 12, further comprising:
an inner side inclined portion formed continuously at the in-plane direction inner side of the outer side flat portion inclined in a direction away from the outer panel; and
an inner side flat portion formed continuously at the in-plane direction inner side of the inner side inclined portion, and extending in the in-plane direction of the inner panel,
wherein the first rib is provided continuously from the outer side inclined portion to the inner side inclined portion.

14. The vehicular resin panel structure of claim 13, wherein the bend portion positioned between the inner side inclined portion and the outer side flat portion.

15. The vehicular resin panel structure of claim 10, wherein:
the first edge portion includes the inner end portion, an outer side inclined portion formed continuously at the in-plane direction inner side of the inner end portion inclined in a direction away from the outer panel, and an outer side flat portion formed continuously at an in-plane direction inner side of the outer side inclined portion and extending in the in-plane direction of the inner panel; and
the first rib is provided continuously from the outer side inclined portion to the outer side flat portion.

16. The vehicular resin panel structure of claim 15, further comprising:
an inner side inclined portion formed continuously at the in-plane direction inner side of the outer side flat portion inclined in a direction away from the outer panel; and
an inner side flat portion formed continuously at the in-plane direction inner side of the inner side inclined portion, and extending in the in-plane direction of the inner panel,
wherein the first rib is provided continuously from the outer side inclined portion to the inner side inclined portion.

17. The vehicular resin panel structure of claim 16, wherein the bend portion positioned between the inner side inclined portion and the outer side flat portion.

18. A luggage door including the resin inner panel and the resin outer panel of claim 10, the luggage door being fixed to the vehicle body at the first fixing point and the second fixing point.

* * * * *